Oct. 18, 1938. C. M. PALMER 2,133,830
CLUTCH
Filed May 24, 1937

INVENTOR
Chester M Palmer

Patented Oct. 18, 1938

2,133,830

UNITED STATES PATENT OFFICE 2,133,830

CLUTCH

Chester M. Palmer, Aurora, Ill.

Application May 24, 1937, Serial No. 144,427

2 Claims. (Cl. 192—67)

My invention relates to improvements in clutches in which a flanged clutch pin is operated longitudinally into and out of engagement with the clutch jaw by the drive belt, and the objects of my invention are: First, to provide excess play between the flanged clutch pin and its slotted seat in the belt driven pulley, whereby friction between the clutch pin and its seat in the pulley may be reduced; Second, to provide an adjustable friction engagement between the clutch mechanism and the driven shaft as a safety device.

I attain these objects by the mechanism illustrated in the accompanying drawing in which—

Figure 1:
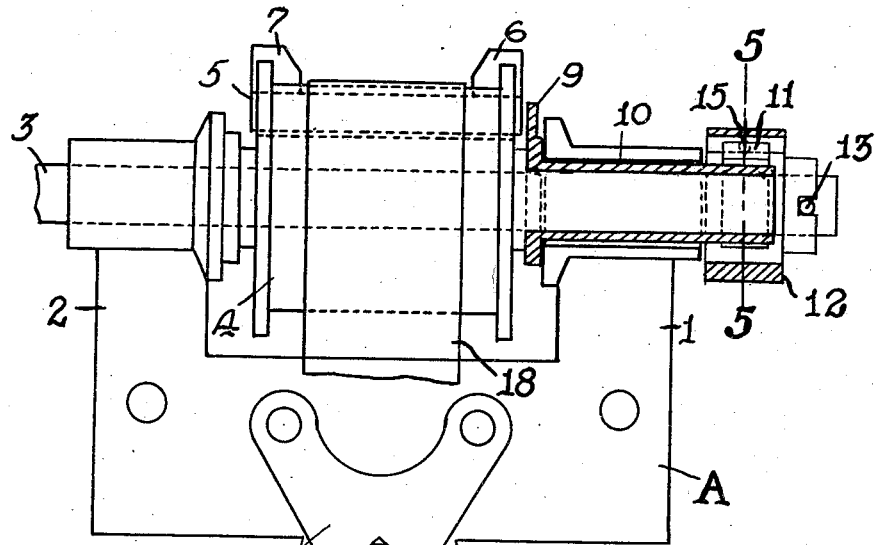
Figure 2:
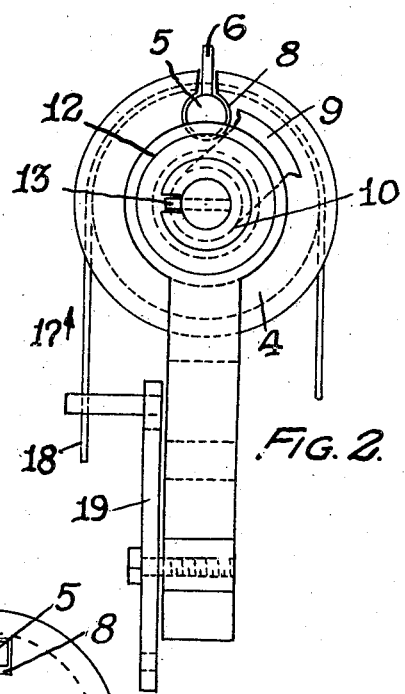
Figure 5:
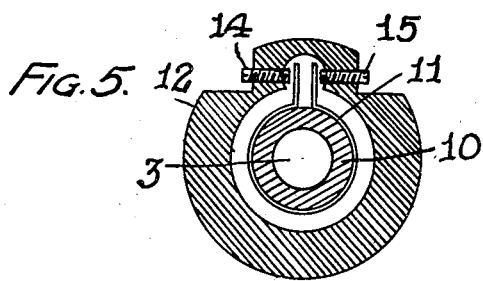
Figure 3:
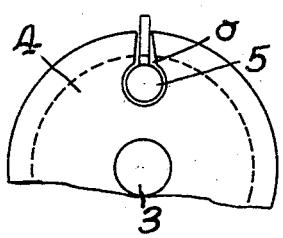

Fig. 1 is a side view partly sectional of the entire machine; Fig. 2 is an end view of the entire machine; Fig. 3 illustrates a form of excess play between a round clutch pin and its seat in the pulley; and Fig. 4 illustrates a square clutch pin and excess play in the pulley seat providing radial adjustment of the clutch pin only; and Fig. 5 is a sectional view taken on line 5—5 of Fig. 1, of the adjustable frictional engaging means between the sleeve and the driven shaft.

In the drawing, A designates a metal frame having two portions 1 and 2 in which the driven shaft 3 is mounted. A flanged pulley 4 is mounted loose on the shaft 3 between the portions 1 and 2. A clutch pin, 5 that may be either round or square and having flanges 6 and 7 at the ends is loosely mounted in a slotted seat 8, extending lengthwise of the pulley 4 to permit longitudinal movement of the clutch pin 5 into or out of engagement with a radial clutch jaw 9, formed on the annular portion of the sleeve 10, mounted loose on the shaft 3 and extending through the bearing 1, some distance and engaged by a winged spring band 11. A hub member 12 has a portion rigidly mounted on the shaft 3 by the pin 13, and a second portion extending over the spring band 11 and provided with set screws, 14 and 15 that engage the winged portions of the band 11 to provide an adjustable friction engagement between the sleeve 10 and the shaft 3.

Figure 4:
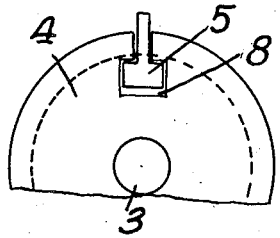

If a round clutch pin 5 is used, excess play is provided in both the round and slotted portion of the seat 8 as illustrated in Fig. 3, if a square clutch pin 5 is used, excess play is provided to permit radial play only as illustrated in Fig. 4.

In operation of the device the pulley 4 is rotated in the direction indicated by the arrow 17 by the drive belt 18 which may be shifted in either direction on the pulley 4 by a belt shifter 19. Centrifugal force will cause the clutch pin 5 to engage the outer wall of the slotted seat 8. When the drive belt is shifted so it engages the flange 6 it will jar the clutch pin 5 loose from the outer wall of the seat 8 permitted by excess play provided in said seat 8 and at greatly reduced friction will very quickly throw the clutch pin 5 into engagement with the clutch jaw 9 which engages and rotates the driven shaft 3, preferably through an adjustable friction engagement as shown and described. When the drive belt is shifted so it engages the flange 7 the clutch pin 5 will be drawn out of engagement with the clutch jaw 9 at greatly reduced friction due to the jarring effect on the clutch pin permitted by excess play provided in the seat 8.

I claim:

1. In a clutch the combination with a frame and a driven shaft mounted on said frame, of a loose pulley on said driven shaft having a slotted seat, a shiftable driving belt on the pulley, a flanged clutch pin in said seat, a clutch jaw on said driven shaft, said clutch pin adapted to be shifted longitudinally into and out of engagement with the clutch jaw by the shifting of the driving belt, said clutch pin having excess play in the pulley seat substantially as and for the purpose set forth.

2. In a clutch, the combination with a frame and a driven shaft mounted on said frame, a loose pulley on said driven shaft having a slotted seat, and a flanged clutch pin in said seat, of a loose sleeve on said driven shaft having a radial clutch jaw adapted to be engaged by said clutch pin, and an adjustable friction drive means between said sleeve and driven shaft substantially as set forth.

CHESTER M. PALMER.